(12) United States Patent
Anderson et al.

(10) Patent No.: US 9,266,627 B1
(45) Date of Patent: Feb. 23, 2016

(54) METHOD, APPARATUS, AND SYSTEM FOR ASTEROID PROSPECTING AND MINING

(71) Applicant: Planetary Resources Development Corporation, Bellevue, WA (US)

(72) Inventors: Eric Anderson, Arlington, VA (US); Peter H. Diamandis, Santa Monica, CA (US); Chris Lewicki, Bellevue, WA (US); Chris Voorhees, Bellevue, WA (US)

(73) Assignee: Planetary Resources Development Corporation, Bellevue, WA (US)

( * ) Notice: Subject to any disclaimer, the term of this patent is extended or adjusted under 35 U.S.C. 154(b) by 437 days.

(21) Appl. No.: 13/869,643

(22) Filed: Apr. 24, 2013

Related U.S. Application Data (60) Provisional application No. 61/637,647, filed on Apr. 24, 2012.

(51) Int. Cl.
*B64G 1/24* (2006.01)
*B64G 1/66* (2006.01)

(52) U.S. Cl.
CPC . *B64G 1/66* (2013.01); *B64G 1/242* (2013.01)

(58) Field of Classification Search
CPC ............ B64G 1/66; B64G 1/68; B64G 1/646; B64G 1/242; G01C 21/02
See application file for complete search history.

(56) References Cited

U.S. PATENT DOCUMENTS

| | | | | | |
|---|---|---|---|---|---|
| 5,512,743 | A | * | 4/1996 | Shaffer | B64G 3/00 250/203.6 |
| 7,913,953 | B2 | * | 3/2011 | Ellinghaus | B64G 1/222 244/159.6 |
| 8,688,833 | B1 | * | 4/2014 | Nishimoto | B64G 3/00 348/143 |
| 8,757,552 | B1 | * | 6/2014 | Martin | B64G 1/10 244/158.1 |
| 9,020,748 | B2 | * | 4/2015 | Olivier | B64G 3/00 701/13 |
| 2014/0306066 | A1 | * | 10/2014 | Burch | B64G 1/646 244/172.4 |

* cited by examiner

*Primary Examiner* — Brian M O'Hara
(74) *Attorney, Agent, or Firm* — Venable LLP; Steven J. Schwarz; Michael A. Gollin (57) ABSTRACT

A method of prospecting asteroids for mining includes (a) launching at least one spacecraft, the spacecraft including a space telescope; (b) examining a plurality of asteroids using the space telescope to gather scientific data on the asteroids for characterization and cataloging; and (c) selecting one or more asteroids to mine from the plurality of asteroids examined by the space telescope and contained within the catalog. A system for prospecting asteroids for mining is also described.

19 Claims, 7 Drawing Sheets

METHOD, APPARATUS, AND SYSTEM FOR ASTEROID PROSPECTING AND MINING

CROSS-REFERENCE TO RELATED APPLICATIONS

This application claims priority under 35 U.S.C. Section 119 of U.S. Provisional Application No. 61/637,647, filed on Apr. 24, 2012, the entire content of which is incorporated herein by reference.

BACKGROUND

Asteroids are remnants left over from the formation of the solar system. As such, it is estimated that various and specific asteroid types likely contain an abundance of concentrated valuable minerals including water and rare metals such as platinum, palladium, iridium, rhodium, osmium and ruthenium. Beginning with the first asteroid, 1 Ceres, discovered on the first day of the 19th century, to the first "Near Earth" (NEO) asteroid, 433 Eros, discovered nearly a century later, there are now over 600,000 known asteroids, nearly 10,000 of which are Near Earth asteroids. While these numbers may be impressive, science has only discovered approximately 1% of all the asteroids estimated to reside in our solar system. The Near Earth asteroids contain some of the most accessible real estate for deep space mission into the solar system, with about 17% of the NEO population being easier and less costly to reach than landing on Earth's Moon.

Asteroids are filled with precious resources, everything from water to platinum. Some near-Earth asteroids contain platinum group metals in much higher concentrations than are found within the richest Earth mines. Asteroids also contain more common metallic elements such as iron, nickel, and cobalt, sometimes in incredible quantities. In addition to water, other volatiles, such as nitrogen, CO, $CO_2$, and methane, exist in large quantities. Semiconductors, metals, and non-metals used in microelectronics manufacture may also be found in asteroids, such as phosphorus, copper, gallium, germanium, arsenic, selenium, cadmium, indium, tin and tellurium.

SUMMARY

An embodiment of the present application relates to a method of prospecting asteroids for mining, comprising: (a) launching at least one spacecraft, the spacecraft including a space telescope; (b) examining a plurality of asteroids using the space telescope to gather scientific data for asteroid characterization and cataloguing; and (c) selecting one or more asteroids to mine from the plurality of asteroids examined by the space telescope and stored within the catalogue.

Another embodiment of the present application relates to a system for prospecting asteroids for mining, comprising: (a) at least one spacecraft; and (b) a space telescope mounted on the at least one spacecraft, the telescope adapted to locate, identify, and/or characterize a plurality of asteroids.

BRIEF DESCRIPTION OF THE DRAWINGS

The foregoing aspects and other features and advantages of the invention will be apparent from the following drawings, wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention. All references cited herein are incorporated by reference as if each had been individually incorporated.

Embodiments of the present application relate to methods, apparatuses, and systems used to identify, characterize, track, and/or mine asteroids, thereby enabling the retrieval of raw materials from the asteroids, ranging from water to precious or rare metals.

Figure 1:
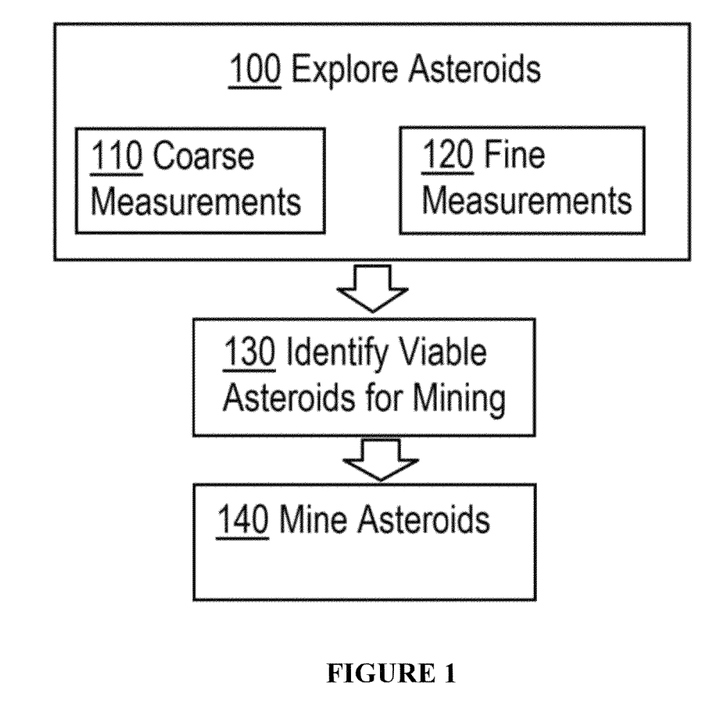
FIG. 1 is flow chart of an exemplary method of prospecting and mining asteroids.
Figure 2:
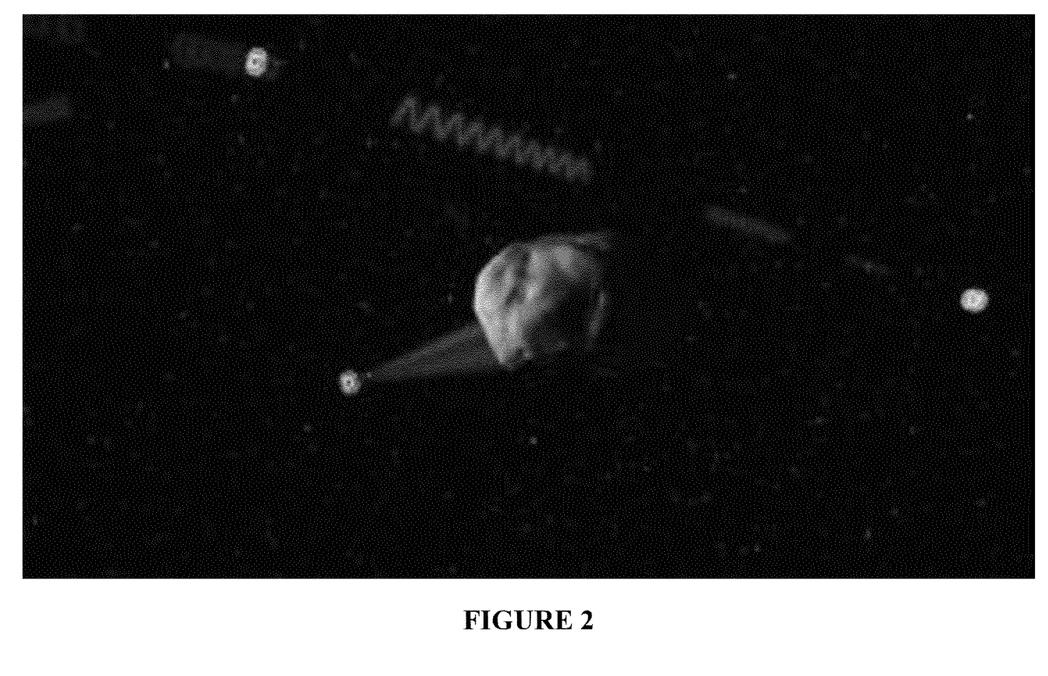
FIG. 2 is an illustration of an embodiment of a spacecraft exploring an asteroid.

FIG. 1 is a flow chart of an exemplary method of prospecting and mining asteroids. According to an embodiment, prospecting the asteroids can begin in step 100 with exploring asteroids to determine their position, composition, and/or the accessibility of their resources. According to embodiments, Earth-remote sensing can comprise inspection using ground telescope. Additionally or alternatively, one or more exploratory robotic spacecraft (e.g., including a space telescope) can launch from earth and travel to the asteroid(s) of interest. For example, the spacecraft can explore, locate, identify, and/or characterize the asteroids of interest, for example, as shown in FIG. 2. Parameters considered while prospecting asteroids can include, for example, which asteroids are easiest to reach energetically, the material needed on them, and the asteroid's periodicity. Additionally or alternatively, the criteria can include: spin rate and pole orientation; bulk type classification; size; existence of binary/ternary; mass and density; shape model; surface morphology and properties; dust environment (natural and induced); gravitational field structure; homogeneity (composition); internal structure (e.g., monolithic vs. rubble pile vs. depth); and/or subsurface properties. Additionally or alternatively, the criteria can include general mineral and chemical composition, such as: presence of resource materials to 10% (e.g., $H_2O$, volatiles); presence of metals, such as Fe, Ni, and Co; and/or trace presence of platinum group metals. These properties can be determined using combinations of known technologies. For example, mineral composition can be determined using spectroscopy, for example reflection spectroscopy. Using such techniques, asteroids can be classified into the existing asteroid spectral classification system, into other existing classifications, and into new classifications relevant to prospecting for particular substances.

According to an embodiment, detailed information about potential ore bodies can be acquired starting with coarse measurements meant to locate higher quality ore from barren lands, for example, in step 110. In step 110, coarse measurements can include flyby missions of the asteroids, for example, using a spacecraft having a space telescope. In step 120, more sensitive, capable and focused equipment can be utilized as the pool of candidate asteroids is reduced through the prospecting process. This can occur, for example, by rendezvous and orbital missions to the asteroids.

Ultimately, enough information on asteroid targets can be acquired to identify viable asteroids for mining, e.g., in step 130. According to an embodiment, the identification can be based at least in part on the concentration of desired materials, the homogeneity of materials, and the economic feasibility of extraction of materials to market.

Once commercially viable asteroids are identified from the candidates, in step 140, spacecraft can access and process (e.g., mine) the resources from the best identified asteroid(s), for example, during subsequent campaigns. This can include, for example, performing an initial proof of concept extraction, subsequent scaling up to larger quantities, and then industrialization and automation of the mining processes.

According to an embodiment, space resource extraction and development can focus on water-rich asteroids. Access to water and other life-supporting volatiles in space can provide hydration, breathable air, radiation shielding, and manufacturing capabilities, among other things.

Water's elements, hydrogen and oxygen, can also be used to formulate rocket fuel. According to an embodiment, water can be mined from asteroids and transported to a network of orbital fuel depots (e.g., gas stations) set up across the solar system, thereby reducing the cost of space operations by 100 times or more. Using the resources of space to help fuel space exploration can enable large-scale exploration of the solar system, thereby providing a feasible opportunity for the sustainable development of space.

According to embodiments, in Earth orbit, water from asteroids can also be converted and used to refuel satellites, increase the payload capacity of rockets by refueling their upper stages, reboost space stations, supply propellant needed to boost satellites from Low Earth Orbit to Geostationary Orbit, provide radiation shielding for spaceships, and provide fuel to space tugs that clean up space debris.

Metals mined from the asteroids can be returned to Earth. To facilitate transportation back to Earth, the metals can be converted to a metal foam structure, however, other embodiments are possible. Details regarding the process of converting the metals to a metal foam structure can be found in applicant's co-pending U.S. Provisional Application No. 61/794,976, filed on Mar. 15, 2013, the entire content of which is incorporated herein by reference. As an alternative to, or in addition to, bringing metals back to Earth, metals from asteroids can also be used directly in space. Metals like iron or aluminum can be moved to collection points in space for purposes such as space construction materials, spacecraft shielding, and raw material for industrial processes at, for example, a space station.

Figure 3:
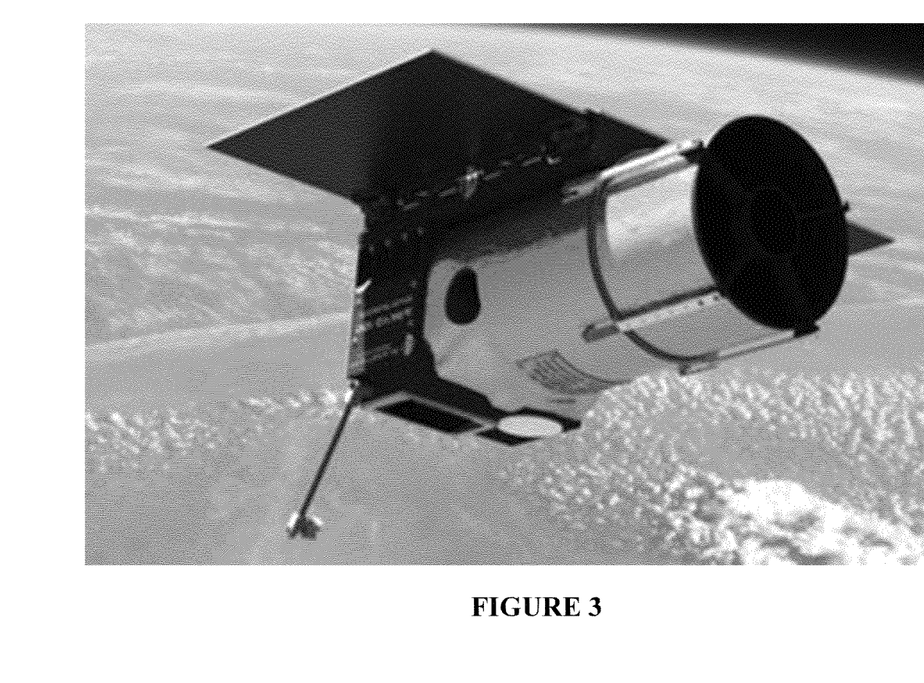
FIG. 3 is an illustration of an embodiment of a spacecraft including a space telescope.
Figure 4:
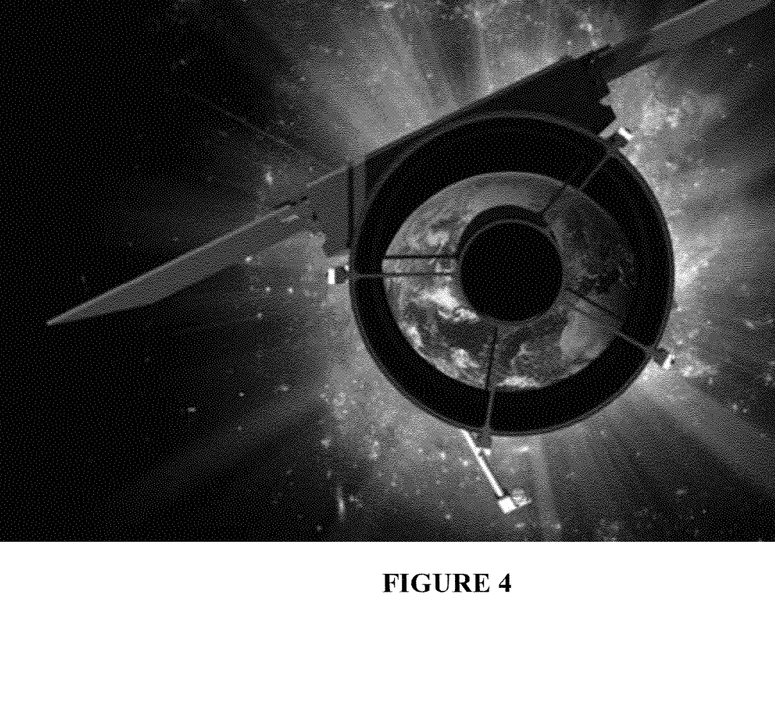
FIG. 4 is another view of the spacecraft of FIG. 3.

Referring to FIGS. 3 and 4, an embodiment of a space craft including a space telescope is shown. The space telescope shown in FIGS. 3 and 4 can be utilized, for example, in low Earth orbit, to explore, examine, and analyze asteroids to identify target asteroids for further consideration. According to embodiments, the space craft shown in FIGS. 3 and 4 can include structures, avionics, attitude determination and control, and instrumentation necessary for low-cost asteroid exploration. According to an embodiment, the space telescope of FIGS. 3 and 4 can include a precision imaging system. With arc-second resolution, the camera can provide detailed celestial and Earth observations where and when desired. Through spectroscopy and other remote sensing techniques, a selection of asteroid candidates suitable for resource exploration can be identified. An example of the space telescope shown in FIGS. 3 and 4 is the Large Scale Synoptic Telescope (LSST). Further details regarding the space craft and space telescope shown in FIGS. 3 and 4 can be found in applicant's co-pending U.S. Provisional Application No. 61/800,813, filed on Mar. 15, 2013, the entire content of which is incorporated herein by reference.

Figure 5:
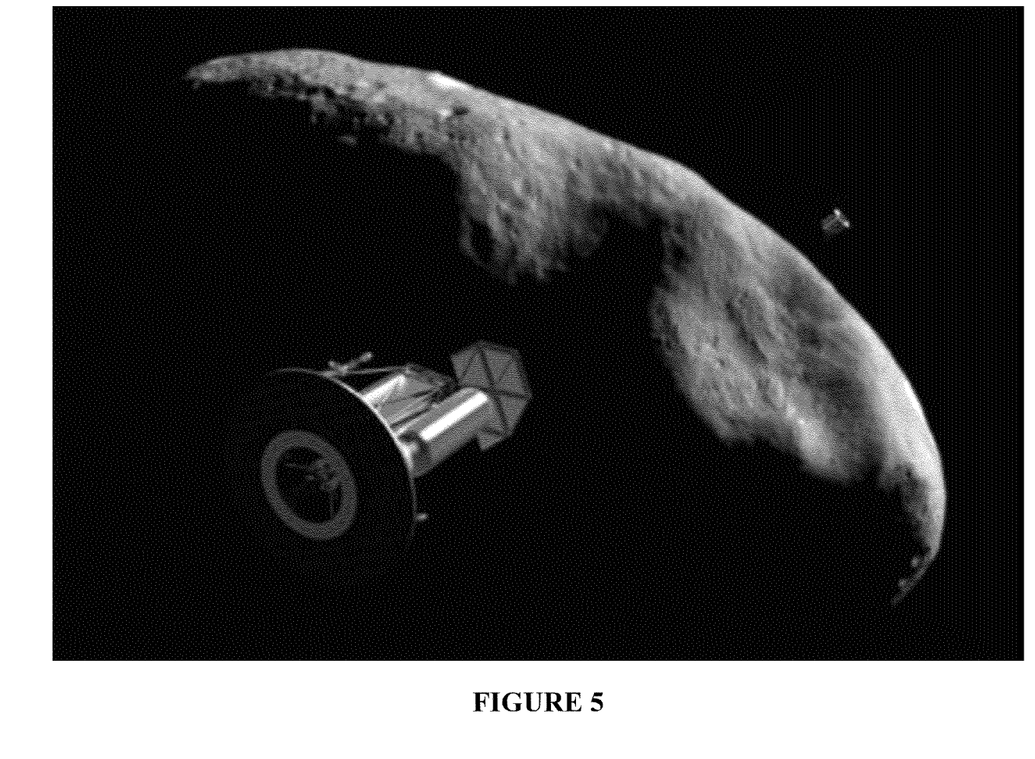
FIG. 5 is an illustration of another embodiment of a spacecraft including a space telescope.

FIG. 5 depicts another space craft including a space telescope. The space craft of FIG. 5 can be similar to that of FIGS. 3 and 4, except that it can further include propulsion capabilities and additional scientific instrumentation. Accordingly, the space craft of FIG. 5 can be suitable for an Earth-crossing asteroid interceptor mission. According to embodiments, the space craft of FIG. 5 can piggy back with a launched satellite headed for a geostationary orbit, allowing the space craft to be well positioned to fly-by and collect data on prospect asteroids. According to embodiments, two or more of the space craft shown in FIG. 5 can work together as a team to potentially identify, track, and fly-by the asteroids that travel between the Earth and our Moon. The closest encounters may result in a planned spacecraft "intercept," providing the highest-resolution data. These missions will allow the quick acquisition of data on several near-Earth asteroids.

Figure 6:
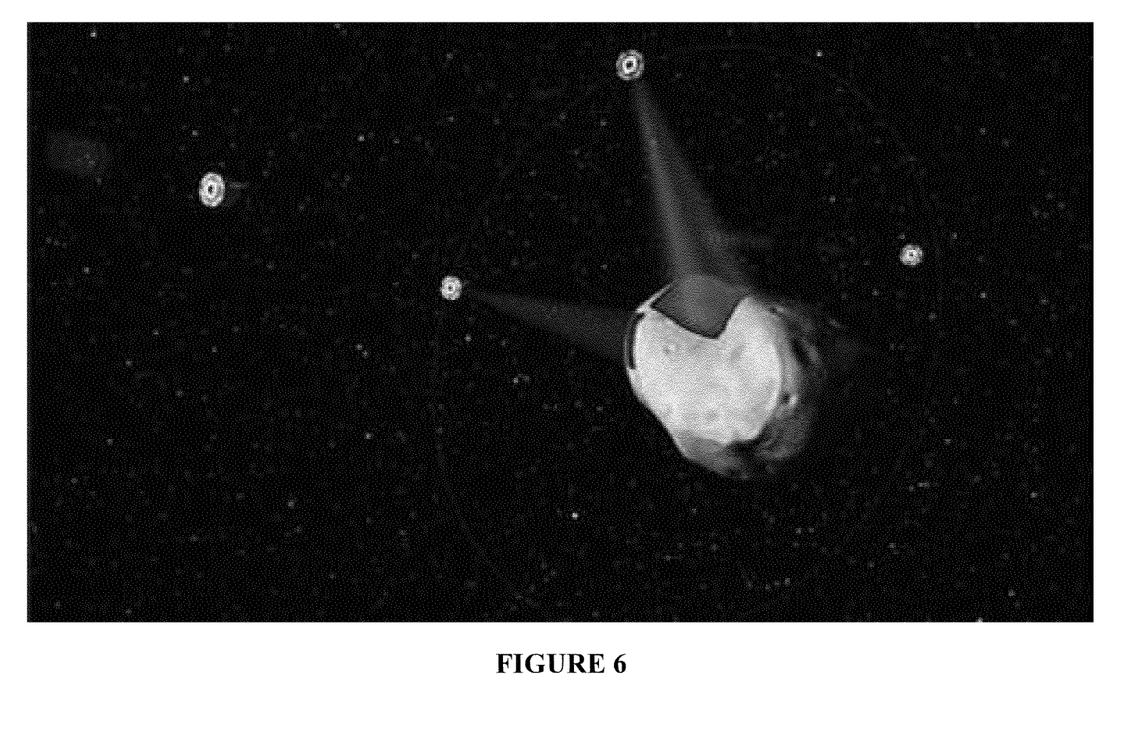
FIG. 6 is an illustration of yet another embodiment of a spacecraft including a space telescope.

Referring to FIG. 6, the spacecraft can be augmented with deep space laser communication capability. This can allow the spacecraft to be launched to a more distant asteroid, much further away from Earth. While orbiting the asteroid, the spacecraft can collect data on the asteroid's shape, rotation, density, and/or surface and sub-surface composition. Through the use of multiple space craft, mission risk can be distributed across several units and allow for broad based functionality within the cluster of space craft. The space craft shown in FIG. 6 can also provide low-cost interplanetary spacecraft capability.

Further details regarding a propulsion system for the space craft of FIGS. 5 and 6 can be found in applicant's co-pending U.S. Provisional Application No. 61/798,739, filed on Mar. 15, 2013, the entire content of which is incorporated herein by reference.

A considerable amount of information must be acquired about the ore-body before detailed "mine planning" can begin. In-situ extraction and processing technologies can be used to provide access to both asteroidal water and metals. Existing rovers, such as the Mars rover, can be fitted with exploratory and/or mining capabilities, such as drills, etc., for the purposes of mining asteroids. Additionally, many known technologies and techniques from mining on Earth can be applied to asteroid mining. An example of a tool can comprise a constellation of spacecraft that are modified to carry mining, extraction, and processing apparatus. Additional tools can include the use of concentrated solar thermal energy directed towards the asteroid from, for instance, a large space deployed solar collector array consisting of inflatable mirrored surfaces precisely angled to focus solar energy in specific directions upon command to process asteroid material through heating. Containment method can be used to manage material, an example of which may comprise a large inflatable or expandable storage unit made of material strong enough to contain raw asteroid materials. Common centrifuges modified for the space environment can be used to separate materials as necessary.

Figure 7:
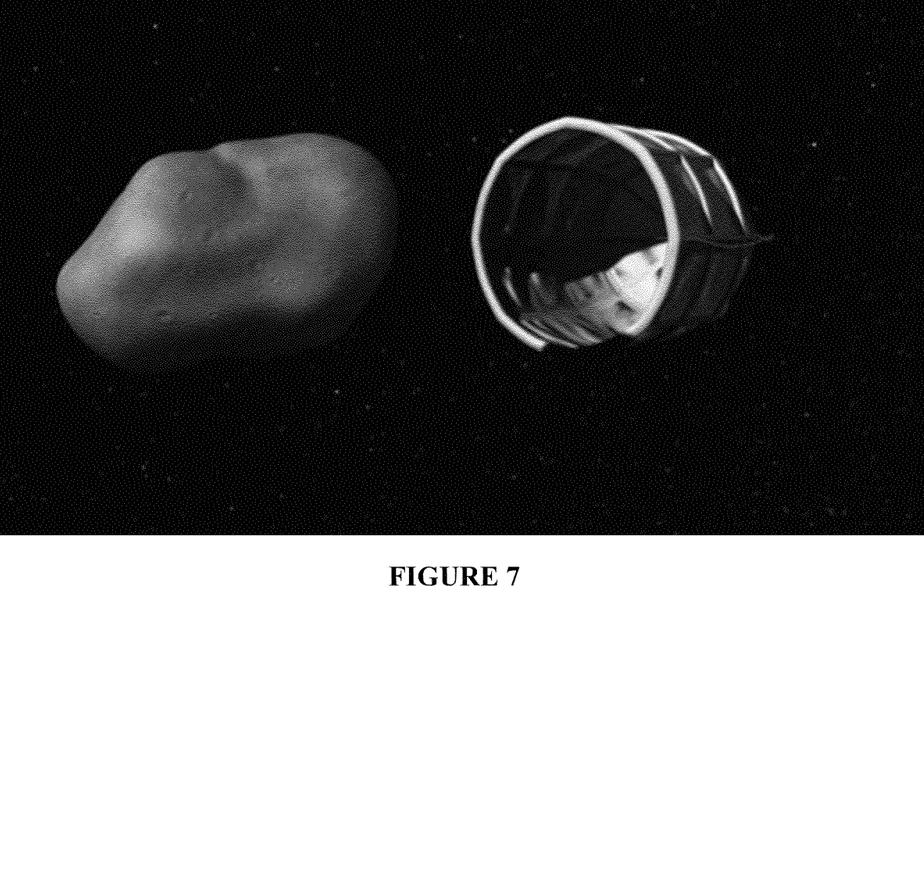
FIG. 7 illustrates an embodiment of mining an asteroid.

FIG. 7 illustrates an embodiment of a spacecraft approaching an asteroid for mining. According to embodiments, the mining spacecraft can comprise one or more relatively autonomous, robotic units that are operated in conjunction with a command and control housed in a ground station on Earth. The command and control can communicate with the mining spacecraft via long range radio antennae or laser communication system. The present application, however, is not limited to the mining spacecraft shown in FIG. 7.

An embodiment of a multi-functional optical subsystem to control the space craft and space telescopes described herein is disclosed in applicant's co-pending U.S. Provisional Application No. 61/799,993, filed on Mar. 15, 2013, the entire content of which is incorporated herein by reference. An example of a machine manager that can be used to control the spacecraft, satellites, mining spacecraft, robotic mining equipment, and/or other devices described herein can be found in applicant's co-pending U.S. Provisional Application No. 61/794,358, filed on Mar. 15, 2013, the entire content of which is incorporated herein by reference in its entirety.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A method of prospecting asteroids for mining, comprising:
   (a) launching at least one spacecraft, the spacecraft including a space telescope;
   (b) examining a plurality of asteroids using the space telescope to gather scientific data on the asteroids for characterization and cataloging;
   (c) selecting one or more asteroids to mine from the plurality of asteroids examined by the space telescope and contained within the catalogue; and
   (d) flying the at least one spacecraft toward the one or more asteroids selected to mine from the plurality of asteroids.

2. The method of claim 1, wherein steps (b) and (c) comprise at least one of locating, identifying, or characterizing the plurality of asteroids using the space telescope.

3. The method of claim 1, wherein step (b) comprises:
   (b1) performing coarse measurements on the plurality of asteroids to identify a subset of the asteroids; and
   (b2) performing fine measurements on the subset of the asteroids.

4. The method of claim 1, wherein step (c) comprises selecting those asteroids rich in at least one of water or metals.

5. The method of claim 1, wherein step (b) comprises performing at least one of spectroscopy or remote sensing on the plurality of asteroids.

6. The method of claim 1, wherein step (a) comprises launching at least one spacecraft from the Earth.

7. The method of claim 1, wherein step (a) comprises launching at least one spacecraft into low-Earth orbit.

8. The method of claim 1, wherein step (a) comprises launching at least one spacecraft into geostationary orbit.

9. The method of claim 1, further comprising orbiting at least one of the plurality of asteroids in at least one spacecraft.

10. The method of claim 1, further comprising:
    (e) mining water from at least one asteroid; and
    (f) converting the water to rocket fuel.

11. The method of claim 1, further comprising:
    (e) mining metal or minerals from at least one asteroid; and
    (f) at least one of returning the metal to Earth, or returning the metal to a space station, or emplacing the contained metal or minerals into a specific orbit.

12. The method of claim 1, wherein the scientific data includes at least one of asteroid spin, mass, shape, homogeneity, or composition.

13. A system for prospecting asteroids for mining, comprising:
    (a) at least one spacecraft;
    (b) a space telescope mounted on the at least one spacecraft, the telescope adapted to perform at least one of locate, identify, and characterize a plurality of asteroids; and
    (c) mining equipment located on the at least one spacecraft.

14. The system of claim 13, wherein the at least one spacecraft includes at least one of avionics, or attitude determination and control.

15. The system of claim 13, wherein the space telescope includes a precision imaging system.

16. The system of claim 13, wherein the space telescope is adapted to perform spectroscopy or radioscopy.

17. The system of claim 13, wherein the at least one spacecraft includes a propulsion system.

18. The system of claim 13, wherein the at least one spacecraft includes a deep space laser communication system.

19. The system of claim 13, wherein the mining equipment includes in-situ extraction and processing equipment.

* * * * *